No. 645,992. Patented Mar. 27, 1900.
F. B. BADT.
PRIMARY BATTERY.
(Application filed Apr. 4, 1898.)
(No Model.)
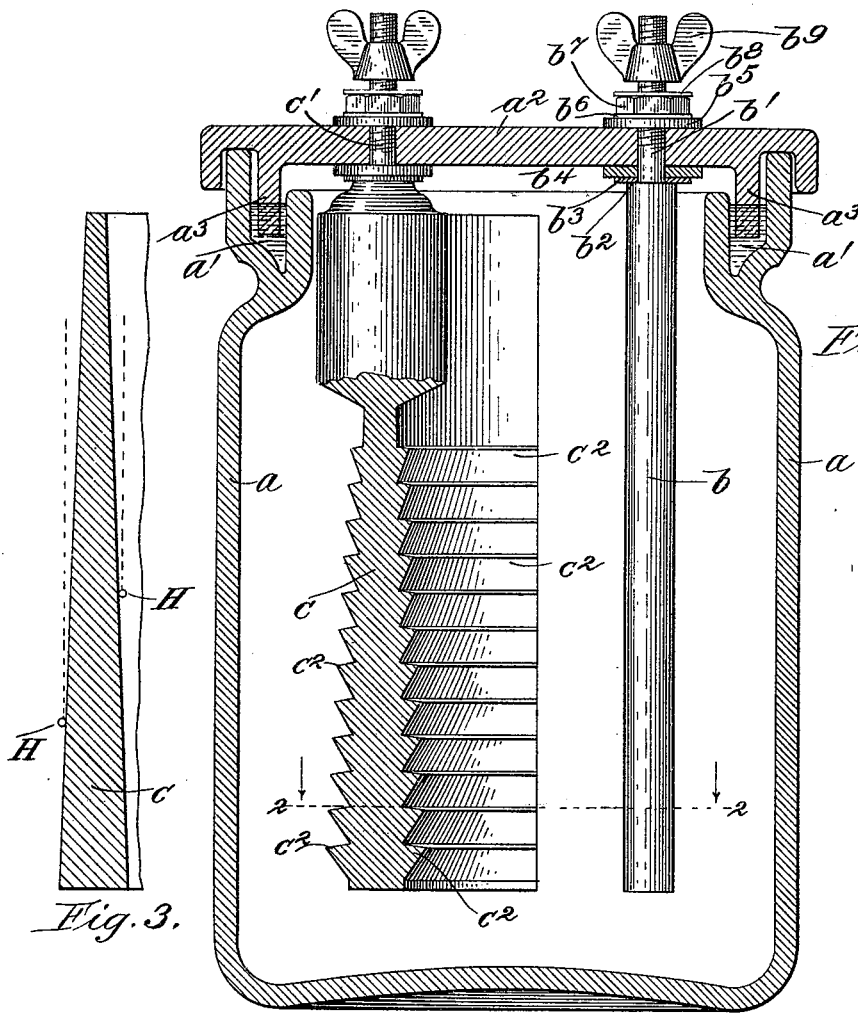
Fig. 1.
Fig. 3.
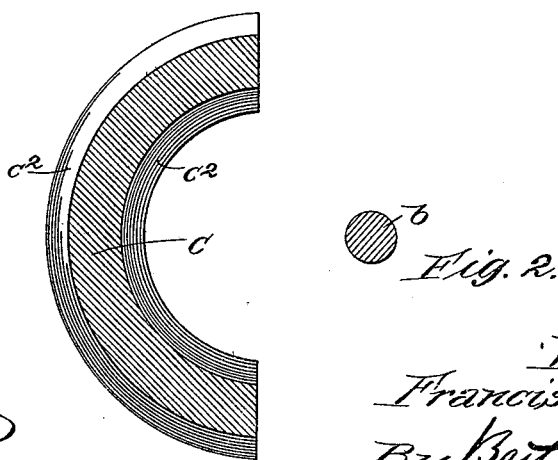
Fig. 2.
Witnesses:
L. W. C. Banner
W. W. Leach.
Inventor,
Francis B. Badt,
By Barton & Brown
Attorneys.

UNITED STATES PATENT OFFICE.

FRANCIS B. BADT, OF CHICAGO, ILLINOIS.

PRIMARY BATTERY.

SPECIFICATION forming part of Letters Patent No. 645,992, dated March 27, 1900.

Application filed April 4, 1898. Serial No. 676,338. (No model.)

*To all whom it may concern:*

Be it known that I, FRANCIS B. BADT, a citizen of the United States, residing at Chicago, in the county of Cook and State of Illinois, have invented a certain new and useful Improvement in Primary Batteries, (Case No. 10,) of which the following is a full, clear, concise, and exact description.

My invention relates to primary batteries; and its objects are, first, to provide an improved construction wherein the jar, though having a removable cover, is sealed air-tight to prevent evaporation of the liquid contents, and, second, to provide improved mechanical means for securing rapid depolarization.

Perhaps the greatest fault to be found with ordinary Leclanché batteries is their liability to become quickly exhausted, this condition being brought about by the evaporation of the liquid electrolyte and the crystallization of the salts upon the surfaces of the jar, cover, and electrodes. Also when the level of the solution gradually sinks the zinc is more liable to be eaten through at the points where it enters the solution, since it is there exposed alternately to various changing chemical and electrochemical actions. In order to prevent the evaporation of the liquid electrolyte of Leclanché batteries, I designed an improved air-tight jar with oil insulation, for which Letters Patent of the United States were granted me February 9, 1897, numbered 576,936. The present invention was designed as an improvement upon the primary battery disclosed in said patent and contemplates especially, besides a novel form of negative electrode, an improved means for supporting or mounting the electrodes, it being my purpose to seal the stems thereof into the loose removable cover of the jar by means hereinafter to be described.

Other features of my invention will be set forth and the details thereof explained specifically by reference to the accompanying drawings, which represent the preferred embodiment of my invention, in which—

Figure 1 is a vertical sectional view of the cell. Fig. 2 is a sectional plan view of the electrodes on line 2 2 of Fig. 1. Fig. 3 represents a cross-section of my improved negative electrode without corrugations upon its surface.

Similar letters of reference are used to designate the same parts wherever they are shown.

The battery-jar $a$ is preferably of the form disclosed in my patent to which reference has been made, such jar having an annular trough $a'$ around its upper edge. The positive or zinc electrode $b$ and the negative or carbon plate $c$ are secured in the novel manner hereinafter to be set forth to the loose removable cover $a^2$. The latter is formed with an annular rib $a^3$, adapted to be seated within the said trough $a'$, so that when the trough is filled with oil the cell will be sealed practically air-tight. The removable glass cover $a^2$ is provided with two holes in its top, through which holes may be passed the threaded stems $b'$ $c'$ of the electrodes $b$ $c$, respectively. The electrodes are both secured to the cover in the same way, and for brevity I will simply describe the mounting of the positive or zinc electrode. The stem $b'$ is preferably smaller in diameter than the rest of the zinc, so that a shoulder $b^2$ is formed where such stem leaves the main body. A zinc washer $b^3$ (or in some cases a threaded nut) is passed down over the stem and abuts against the shoulder $b^2$. Next a soft-rubber washer $b^4$, tightly encircling the stem, is pressed down upon the same until it abuts against the zinc washer $b^3$. Now the stem may be inserted through the hole in the cover from beneath, so that the rubber washer $b^4$ engages with the under side of the glass cover, whereupon the rubber washer $b^5$ is pressed down upon the stem, engaging with the upper side of the cover. A threaded nut $b^7$ is now screwed upon the stem, a zinc washer $b^6$ preferably being interposed between the nut and the rubber washer $b^5$. It will be seen that as the nut is tightened the two soft-rubber washers $b^4$ $b^5$ will be compressed, engaging closely with the glass cover and effectually packing the hole through which the stem of the electrode is passed. A zinc washer $b^8$ is next slipped over the stem against the nut $b^7$, and a winged binding-nut serves to secure the terminal of the circuit-conductor in place between the washer $b^8$ and itself. The above construction is simple and very efficient and convenient. The parts are assembled without difficulty, and the jar is maintained air-tight to prevent evaporation of the liquid contents.

One of the principal differences between the several varieties of primary batteries lies in the various means which are resorted to for depolarizing the negative electrode. These means may be generally classified as mechanical, chemical, and electrochemical. Well-known mechanical means consists in so forming the negative electrode that it will present a comparatively-large surface. The surface has also been roughened, as in the well-known Smee cell, whose negative electrode is horizontally corrugated.

I have found by observations and experiments that when the surface of the negative electrode is vertical the hydrogen bubbles will cling to its surface while they slowly asscend thereon until they reach the top of the liquid and burst. When, however, the surface of the electrode is inclined at an angle, the bubbles will not cling to the surface, but will leave it and rise vertically through the liquid. Taking advantage of this discovery, I have constructed the negative electrode $c$ as shown in the drawings, being preferably of carbon, in the form of the half of a hollow cylinder, the thickness of the material being considerably thicker at the bottom than at the top. A vertical section of the electrode, therefore, will be of trapezoidal shape, the base of the trapezoid being wider than the top. As illustrated in Fig. 3, each hydrogen bubble H will when it reaches a certain size leave the surface of the carbon plate almost at the point where it originally formed and rise vertically through the liquid, as indicated by the dotted lines. To assist these bubbles in escaping, I preferably provide horizontal corrugations upon the surface of the negative plate, said corrugations being in the form of upwardly-projecting ledges $c^2 c^2$, having sharp edges at which the bubbles will be liberated.

I am aware that, broadly speaking, it is not new in the art to roughen the surface of the negative electrode of primary batteries, and I am also aware that air-tight cells having the electrodes sealed into the same have heretofore been constructed, so that it will be understood that I do not wish the claims hereinafter made to be given any such sweeping construction; but, Having set forth my invention, I do claim and desire to secure by Letters Patent—

1. A negative electrode for a primary battery, said electrode being thicker at the bottom than at the top, so that its sides are inclined at an angle to the vertical, the surface of said electrode being corrugated horizontally, such corrugations being in the form of upwardly-projecting ledges having sharp edges, substantially as and for the purpose described.

2. In a primary battery of the class in which the electrolyte is a salt solution, the combination with a jar, of a removable cover therefor, said cover having an annular rib on its under surface, an annular trough formed about the mouth of said jar in which the said rib is adapted to be seated, positive and negative electrodes having stems passing through and secured to the cover, said negative electrode being thicker at the bottom than at the top and having its surface corrugated horizontally, forming upwardly-projecting ledges upon said electrode, and rubber packings above and below the cover around said stems to render the joints air-tight, substantially as shown and described.

3. An electrode for batteries, made thicker at the bottom than at the top and provided with transverse corrugations, substantially as described.

In witness whereof I hereunto subscribe my name this 2d day of April, A. D. 1898.

FRANCIS B. BADT.

Witnesses:
EDW. A. MEYSENBURG,
GEORGE L. CRAGG.